United States Patent [19]
Elliott

[11] 3,817,278
[45] June 18, 1974

[54] SPRING CLOSING CHECK VALVE
[75] Inventor: Robert E. Elliott, Tulsa, Okla.
[73] Assignee: FWI, Inc., Tulsa, Okla.
[22] Filed: Aug. 9, 1971
[21] Appl. No.: 169,911

[52] U.S. Cl. ............................... 137/527, 137/236
[51] Int. Cl. ............................................ F16k 15/03
[58] Field of Search............ 137/247.19, 527, 527.2, 137/527.6, 535, 236

[56] References Cited
UNITED STATES PATENTS

| 980,188 | 1/1911 | Blauvelt | 137/527 X |
| 1,180,389 | 4/1916 | Friend | 137/527 X |
| 1,605,254 | 11/1926 | Martell | 137/527 X |
| 3,177,894 | 4/1965 | Camp | 137/527 X |
| 3,482,603 | 12/1969 | Outcalt | 137/527 X |

FOREIGN PATENTS OR APPLICATIONS

| 660,717 | 7/1929 | France | 137/535 |
| 532,241 | 1/1941 | Great Britain | 137/527 |
| 311,901 | 10/1933 | Italy | 137/527 |

Primary Examiner—Robert G. Nilson
Attorney, Agent, or Firm—Head and Johnson

[57] ABSTRACT

A check valve for use on a buried pipeline includes compressional spring means connected by linkage to the clapper, and extending upwardly in a vertical tubular extension to the valve housing. Means sealed through the closed top end of the extension permit vertical adjustment of the position of the top end of the spring.

5 Claims, 4 Drawing Figures 3,817,278

SPRING CLOSING CHECK VALVE

BACKGROUND OF THE INVENTION

1. Field of the Invention

This invention is in the field of check valves for use on pipelines, particularly lines of large diameter.

More particularly, it is concerned with check valves which contain means to exert adjustable spring forces on the clapper.

2. Description of the Prior Art

In the prior art there are many examples of check valves with hinged clappers attached to shafts which extend through the wall of the valve body. Thus many devices can be attached to the shaft outside the body housing for controlling the motion of the clapper. These are troublesome since they involve the sealing of high fluid pressure about the clapper shaft, and develop high torsional stresses in the shaft.

SUMMARY OF THE INVENTION

This invention overcomes the difficulties of the prior art devices by placing the spring control means inside the pressure-containing valve housing. This obviates the need of a high pressure fluid seal around the moving clapper shift, which in this case is sealed entirely inside the housing. The spring control means is placed inside an extension to the housing which takes the form of a long vertical tube. This serves also to bring the top of the extension to the surface of the ground (after the pipeline is buried) where an adjustment control is provided by means of which the compression in the out spring can be adjusted. This obviates the need of a vault or other structure to house the valve and to permit manual entry to make adjustments of the control spring. This invention is particularly adaptable to large diameter buried pipelines, such as from 10 to 48 inches diameter.

It is the object of this invention to provide a check valve with spring adjustment means placed inside the valve housing and subject to fluid pressure in the piepline, and with convenient means to adjust the spring available at the earth's surface, above the pipeline, and to utilize a helical compression spring (rather than a torsional spring). A compression spring is more reliable and is more easily adjusted.

These and other objects and details of the invention will be evident from the following description taken in conjunction with the appended drawings, in which:

BRIEF DESCRIPTION OF THE DRAWINGS

FIG. 3 showing the case for the valve closed, and FIG. 4 for the valve open.

DESCRIPTION OF THE PREFERRED EMBODIMENT

Figures 1, 2, 3, 4:
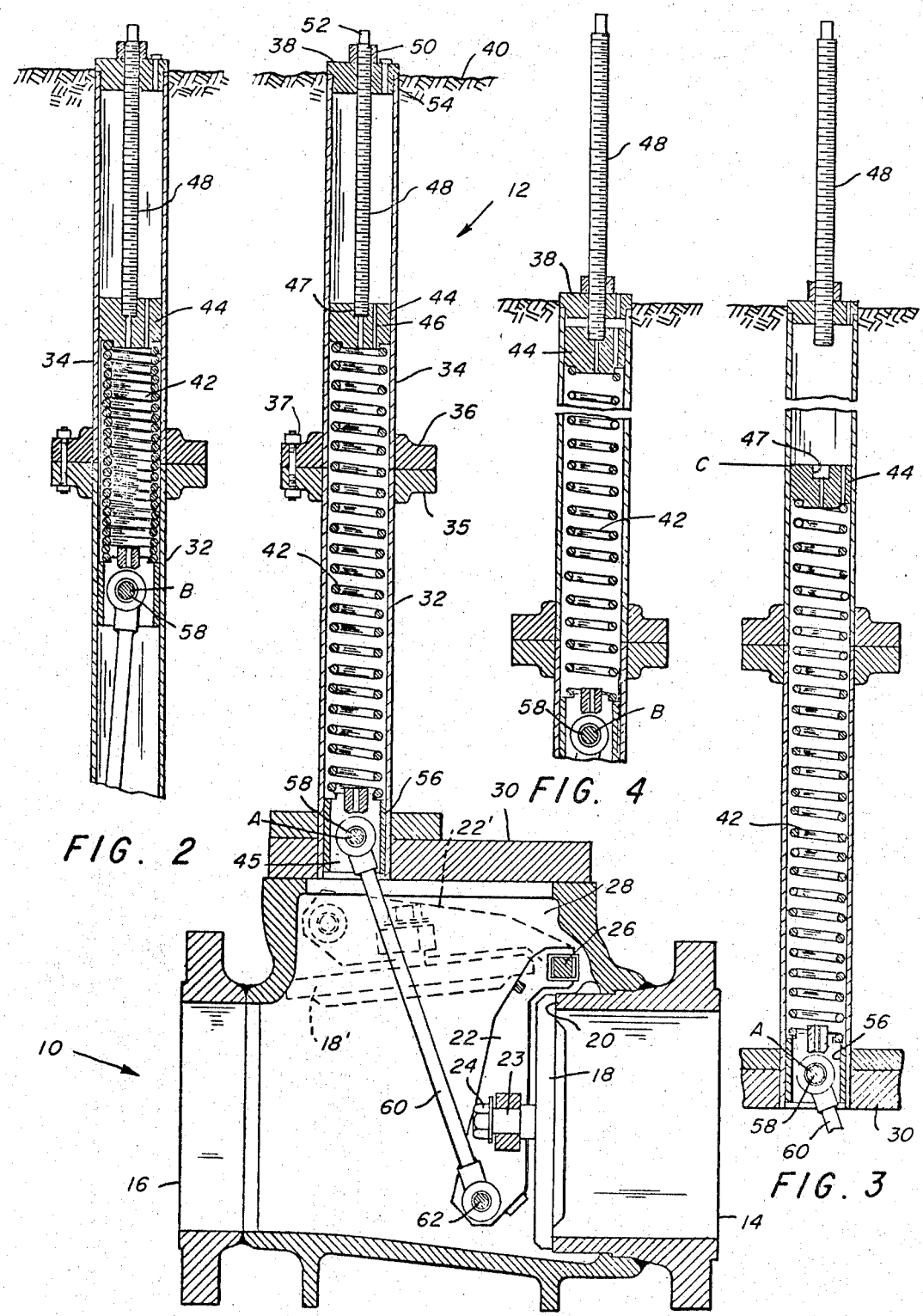
FIG. 1 shows one embodiment of this invention in which the operating spring is adjusted for maximum compression, and with the valve closed.
FIG. 2 shows in vertical section a portion of FIG. 1 with the spring further compressed due to the opening of the valve.
FIGS. 3 and 4 show a portion of FIG. 1 with the spring adjusted for minimum compression.

FIG. 1 illustrates the complete assembly of one embodiment of this invention. It comprises a check valve portion 10, and a control spring housing portion 12.

The valve has an inlet 14 and an outlet 16 with a clapper 18 adapted to seal against a seat 20. The clapper is supported by rod 23 and nut 24 from an operating arm 22 that is hinged about shaft 26. The clapper is shown in the closed position. With fluid flow from the right the valve will open and the clapper will swing to the left. When the fluid flow reduces, the clapper will drop and when the flow reverses the clapper will close and seal off the flow.

In order to reduce clapper slamming tendency, with attendant damaging hydraulic shock and surge, a spring force, which acts together with the clapper weight, must often be applied to the clapper, insuring its very prompt closure.

Prompt closure, before substantial back-flow velocity develops, is essential, particularly in liquid check valves. The necessary spring force varies according to the location of the check valve in the hydraulic system, together with the design of the system and its pumps. No more spring pressure is desired past that which is just needed to prevent violent slamming.

A torsion spring can be placed outside the body, twisting force applied to the clapper through the operating shaft 26 (by bringing the shaft out through the wall of the housing.) Of course, this would cause considerable difficulty due to the need for a pressure seal around the operating shaft 26, and entails the use of a torsion spring and rather complicated torsional adjusting means.

Also, since the pipelines and valves are generally buried at considerable depth below the earth's surface, this would require the construction of a vault or underground chamber surrounding the valve, to provide access to it.

This is obviated by constructing a tubular extension 12 to the valve housing that extends up to (or above) the surface 40. This extension is comprised of one or more tubular elements 32, 34 fastened into the top cover 30 of the valve. The separate elements are joined by flanges 35, 36 and bolts 37. The top of the topmost element 34 is closed with a plate or plug 38. The complete extension is sealed against the fluid pressure in the valve. Means 54 is provided to bleed air from the system, as is well known in the art.

The spring is provided in the form of a helical compression spring 42 of a diameter that permits it to slide freely in the elements 32, 34. The upper and lower ends of the spring *are abutted* to a floating plug 44 (at the top) and a crosshead 56 at the bottom. These are cylindrical and have a sliding fit in the elements 32, 34. They also have vents, such as 45, 46 through which fluid can flow as they move up and down in the elements 32, 34. The crosshead 56 has a pin 58 on which rotates a connecting linkage 60, the lower end of which is rotatable about pin 62 attached to arm 22 supporting clapper 18. When the clapper is closed, the crosshead 56 is at position A within the element 32. When the clapper 18 opens to its maximum opening, the crosshead 56 rises within element 32 to position B (FIG. 2). This motion of the linkage moves the lower end of the spring, and depending upon the position of the upper end of the spring, the spring will be compressed to a greater extent, than when at position A (FIG. 1).

The final position of the floating plug 44 is controlled by means of the threaded rod 48. This is threaded through the top plate 38, is rotated by a tool placed over the end 52 (not shown), and is locked in position by lock nut 50. Means are provided, as is well known in the art, to seal leakage of fluid through the plug 38.

In FIG. 2 the threaded rod 48 is screwed down to the lowest position. Thus, when the crosshead 56 comes to position B, the spring 42 is compressed to its maximum, and the maximum force is applied on the clapper. As the clapper drops down, the linkage moves down and the compression in the spring is reduced.

If the magnitude of the control force is to be reduced, the threaded rod 48 is screwed out, permitting the upper end of the spring to move up. With rod 48 retracted, as in FIG. 3, the spring is entirely uncompressed when the valve is closed. As the valve opens, the entire spring moves upwardly until the floating plug 44 strikes the rod 48, which seats in the depression 47. When the floating plug 44 engages rod 48, spring 42 begins to compress, and a closing force builds up on the clapper. When rod 48 is fully retracted, and the valve is fully open, and crosshead 56 in the maximum upward position, spring 42 is still totally uncompressed, and still exerts no force on crosshead 56 and clapper 18. With rod 48 fully retracted a zero spring effect is obtained. For example, when running pigs or spheres through the valve it is desirable to have zero compression of the spring through all positions of the clapper, including the full open position.

Thus, by setting the position of threaded rod 58 to any selected position, the compression of the spring, in terms of force, as a function of the opening of the valve, can be varied and set to provide any desired maximum force, or none at all. Also, since the extension 12 is designed to reach (or extend beyond) the ground surface 40, the relation of force to opening can be changed at will, even though the valve housing is deeply buried, and without having to shut down the system.

It will be clear that by adding tubular elements such as 32, 34, and by using a correspondingly longer threaded rod 48, the valve (and the pipeline to which it is attached) can be buried to any desired depth in the earth and still have the top 52 of the threaded rod available at the surface of the earth for making adjustments on the helical spring.

In designing a valve to incorporate this invention, it is important that the clapper 18, when reaching its fully-open position, has its terminal upper position controlled by the backside of the clapper contacting the interior walls of the valve body, rather than the coils of spring 42 having come solidly and totally shut. For example, if the length of rod 48 is made a little too long, then the clapper in the upward swing would cause a tremendous shock load applied upwardly to the top of upper cylinder element 34 when spring 42 is solidly compressed. The valve can be made inherently safe by providing just the correct length of adjusting screw 48 so that there is never any danger of the spring 42 becoming absolutely solid, no matter how the adjustment screw is positioned. Thus, referring to FIG. 2, the small amount of final clearance between the adjacent coils of spring 42 indicates that, even with adjusting screw 48 fully downwardly advanced, the spring does not become solid when the valve clapper is fully opened.

Therefore, the embodiment illustrated in the drawings fully meet the object of this invention.

While the invention has been described with some particularity, it will be clear that from the principles which have been described, one skilled in the art will be able to devise other embodiments, all of which are considered to be part of this invention which is not to be limited to the abstract, the description or the drawings, but is to have the scope of the appended claim or claims, when construed to the full equivalents of each element.

What is claimed is:

1. In a check valve, including a housing, a valve seat, and a hinged clapper assembly adapted to seal against said seat, the improvement comprising:
   a. a tubular upward extension of said housing, the upper end of said extension being closed by a top plate having a threaded opening therein;
   b. a helical compression spring inside said tubular upward extension of said housing;
   c. screw means threadably sealed through said top plate for externally selectively positioning the top end of said spring;
   d. linkage means hingedly fastened at a first end to the bottom end of said spring means, and at its second end to said clapper assembly,
   whereby when said clapper moves away from said seat, said linkage means pushes on said spring, compressing it, the amount of compression being adjustable externally of said valve body by threadable position of said screw means, the length of said tubular upward extension being sufficiently great that when said screw means is fully upwardly positioned said clapper assembly may fully open without compressing said spring.

2. A check valve according to claim 1 including a cross head member slidably positioned in said tubular upward extension, the bottom of said compression spring being received by said cross head and the first end of said linkage means being pivotally attached to said cross head.

3. A check valve according to claim 1 wherein said second end of said linkage means is attached to said clapper assembly at a point below the center of said clapper assembly.

4. A check valve according to claim 1 including a floating plug slidably received in the upper end of said tubular upward extension, the upward end of said spring having engagement with said floating plug, the upper limit of travel of said floating plug being controlled by said screw means.

5. A check valve according to claim 1 wherein said valve housing includes an interior space in the top thereof for positioning the clapper so as to provide a clear passage through the valve when the clapper is in the full open position.

* * * * *